Nov. 6, 1951 W. W. STEVENSON 2,574,198
FLUID METER
Filed July 8, 1944 7 Sheets-Sheet 3
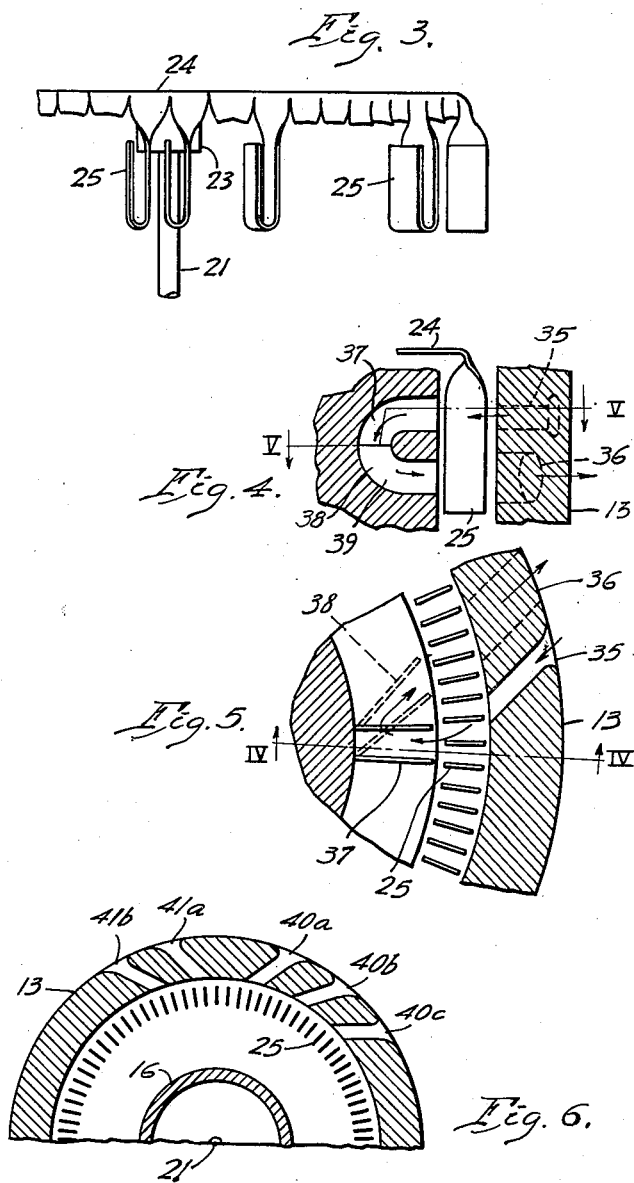
INVENTOR.
Wilbur W. Stevenson.
BY William R. Coley
Attorney.

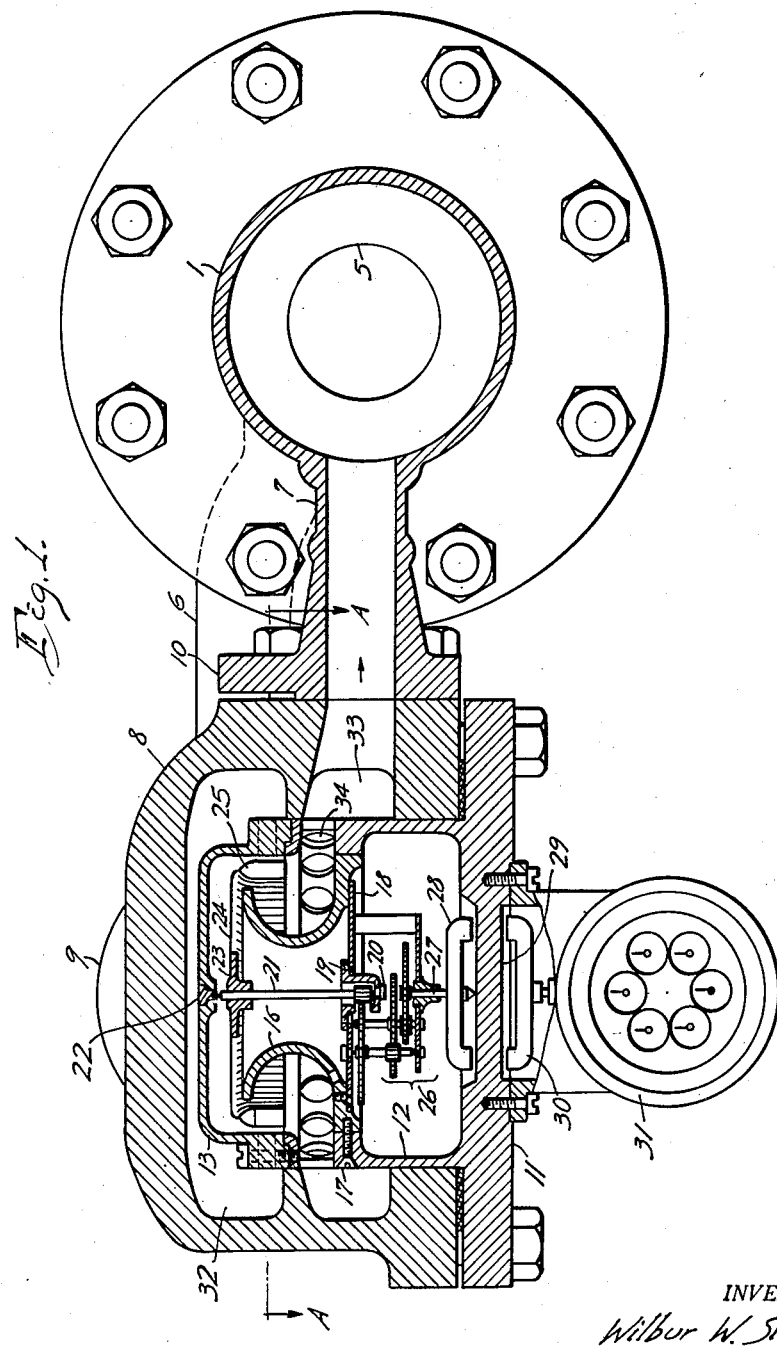

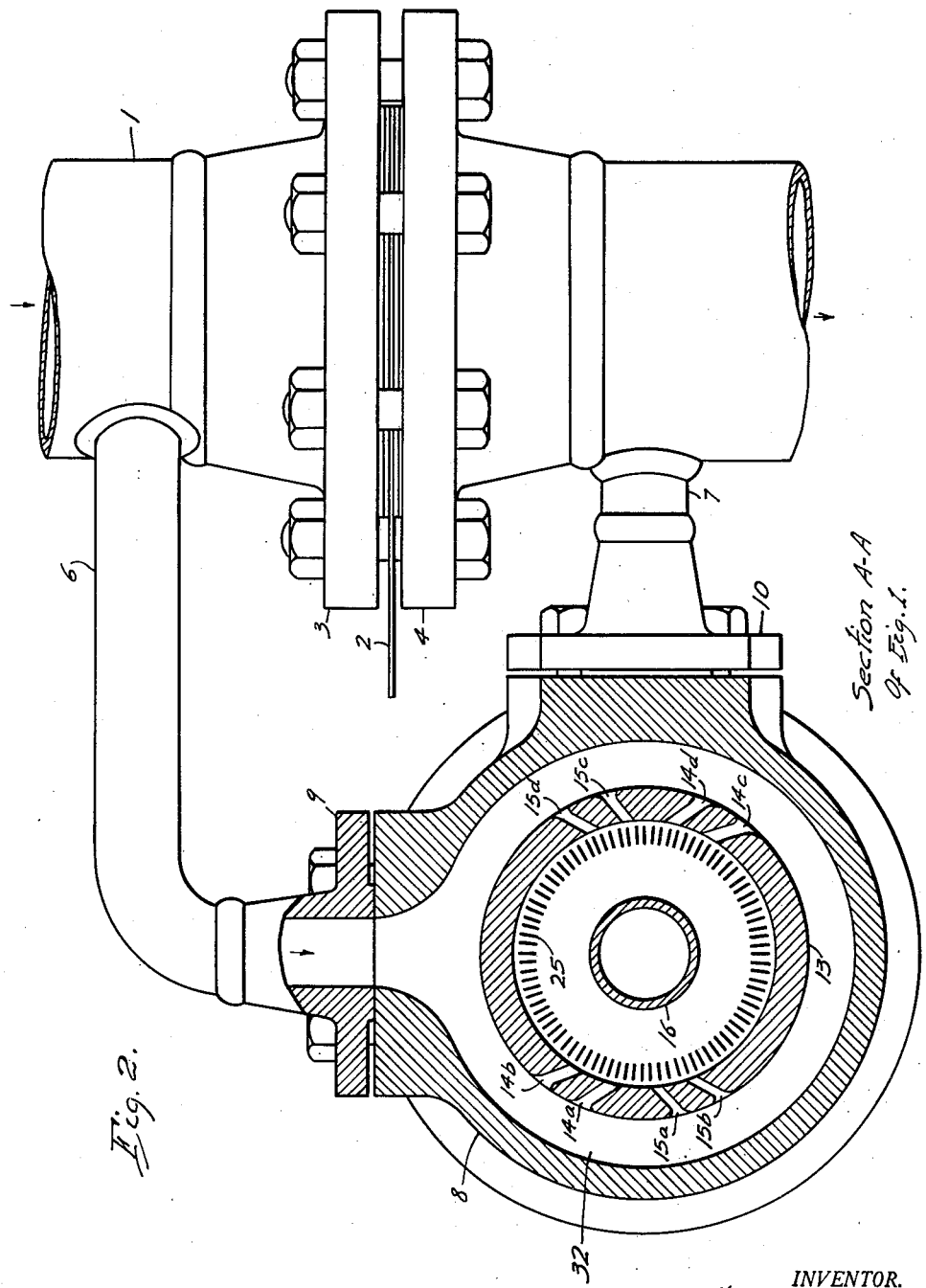

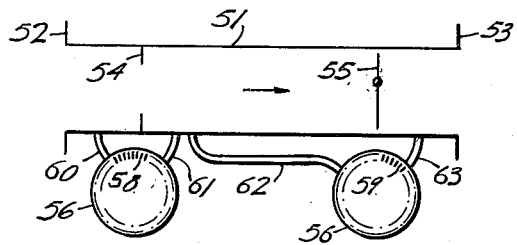
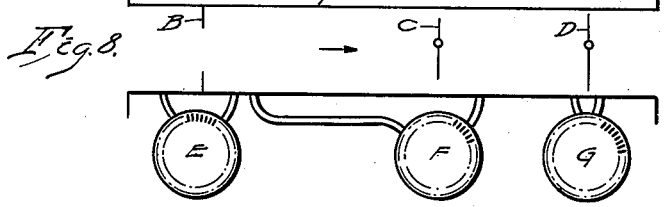
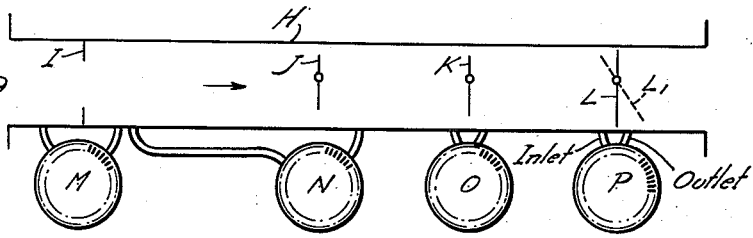
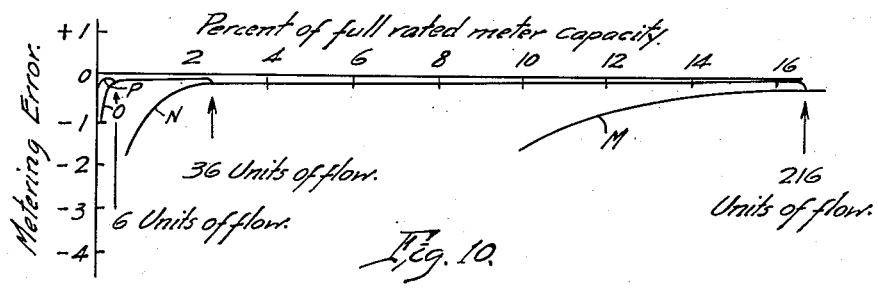

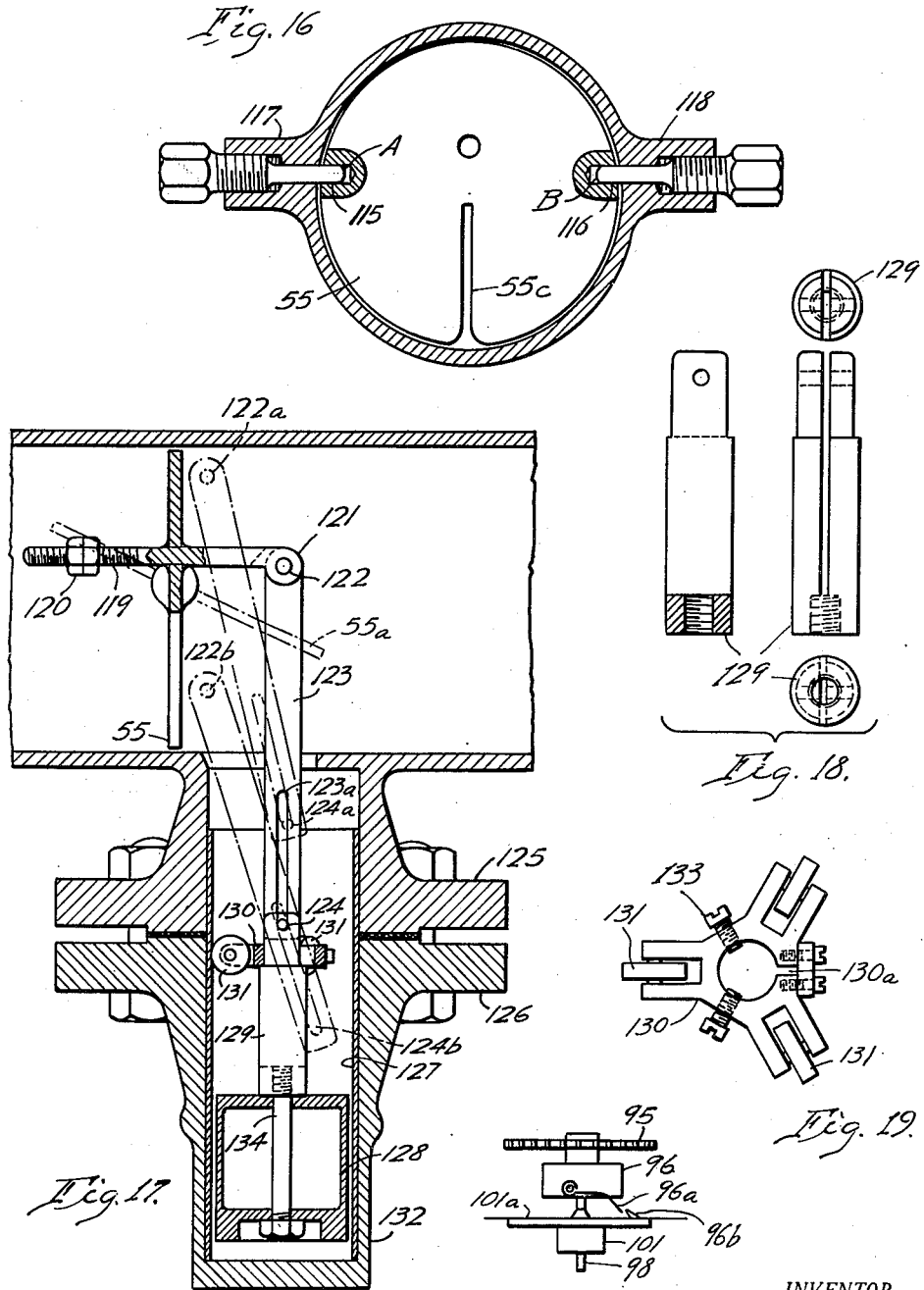

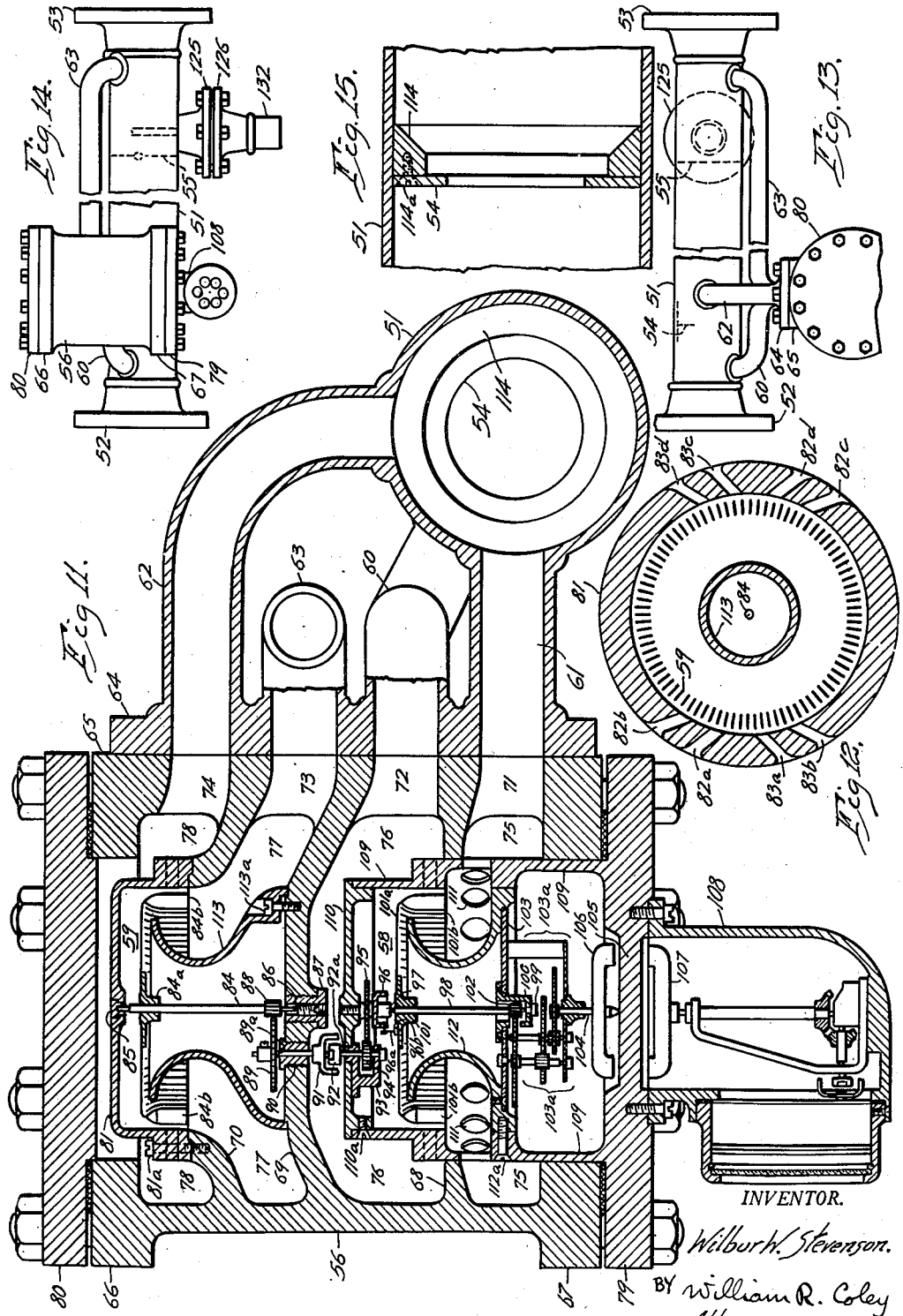

Patented Nov. 6, 1951

2,574,198

UNITED STATES PATENT OFFICE 2,574,198

FLUID METER

Wilbur W. Stevenson, Pittsburgh, Pa.

Application July 8, 1944, Serial No. 544,008

10 Claims. (Cl. 73—197)

My invention relates to fluid meters, and it has special reference to turbine type flow meters, particularly the variety used in the measurement of gaseous fluids. The device is primarily applicable to the measurement of fluid in quantities larger than could be normally passed through the rotating element of the meter. Provision is therefore made to by-pass the major portions of the fluid stream through a restriction in parallel with the meter rotor so that the entire measuring device constitutes a shunt meter.

My invention is in part an improvement in the means employed to drive the turbine rotor of the meter, which improvement incorporates and includes the function known as dampening in other similar meters, and improvement in design of the fluid passageway to, from, and across the blades of the rotating element.

Among the objects of the invention are—

1. Provide an improved type of meter by eliminating the causes of metering errors formerly associated with dampening.

2. Make available a greatly simplified meter by the elimination of these undesirable features.

3. Incorporate a rotating element so constructed as to conform in principle with practices established by high authorities as being the most efficient; namely, one having the driving fluid directed radially inward toward the rotor shaft. Structurally, however, the rotor involves a new, simplified, inexpensive and very efficient set of blades.

4. Extend the metering range of an elementary meter by making possible increased rotor speeds.

5. Simplify an elementary meter to make it conveniently possible to so compound this meter indefinitely, so as to secure accuracy of metering over a very wide range.

6. Utilize the principle of a dynamic differential for retarding or controlling the speed of the rotor.

7. Provide a removable closure for one side of a meter casing, the rotor being mounted on the inner side of the closure and an integrator on the outer side thereof, so that the rotor and integrator may be readily removed along with said closure as a unit.

8. Provide a meter which, through the use of certain duplicate structures, may be readily adapted to include three, four or any desired greater number of rotors, all operating on a single integrator.

The meter comprises a simplified turbine wheel driven in a novel manner and mounted on jewel bearings, and driving an underslung integrating counter through reduction gearing. The rotary motion is transmitted through the rotor housing to the integrator by means of interior and exterior revolving magnets operated on opposite sides of a non-magnetic partition.

Other objects of my invention will become evident from the following description, taken in conjunction with the accompanying drawings, in which:

Figures 1 and 2 show assemblies of the meter, Fig. 1 being a vertical cross-section, and Fig. 2 a plan-view with a horizontal cross-section through the rotating element, carrying the fluid, such as steam, to be measured.

Fig. 3 is a detail view of the blades on my rotor.

Figure 21:
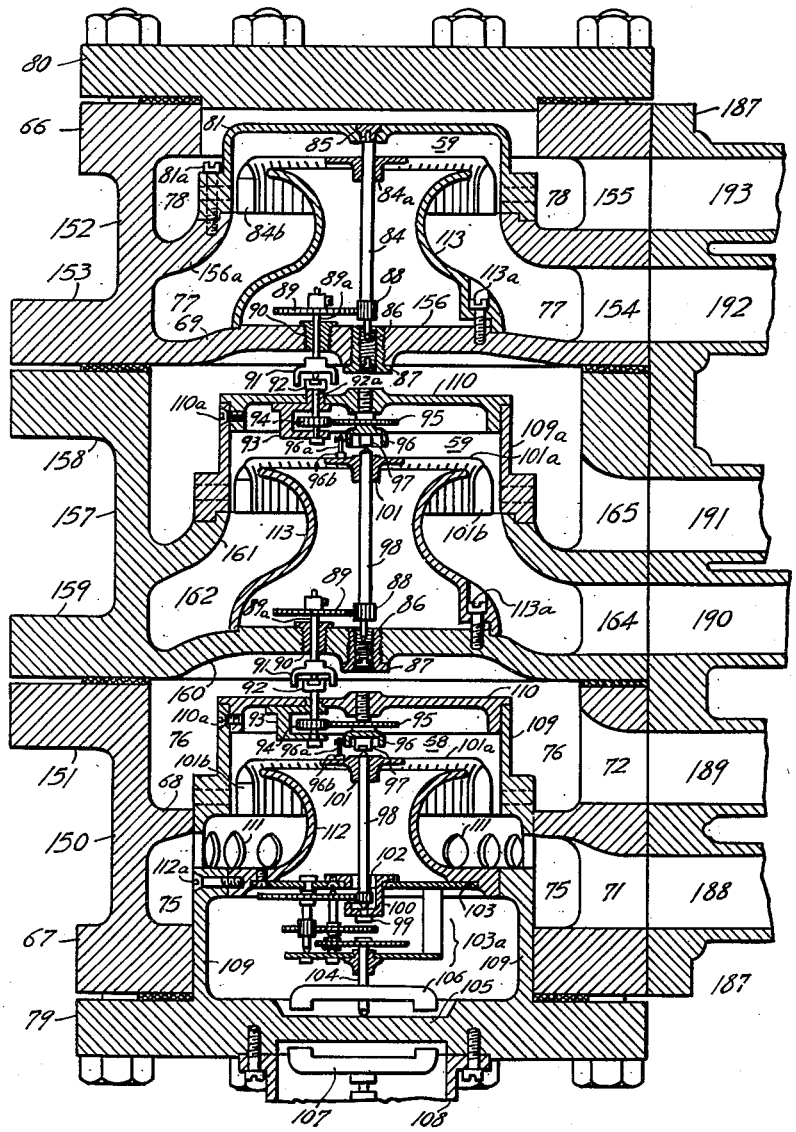

Figs. 4, 5 and 6 show alternate constructions for driving and retarding the rotor. Fig. 4 is a sectional view taken on line IV—IV of Fig. 5. Fig. 5 is a sectional view taken on line V—V of Fig. 4.

Figs. 7, 8 and 9 are diagrammatic views, and Fig. 10 a chart relating to my compound meter.

Fig. 11 is a vertical sectional view of my compound meter.

Fig. 12 is a cross-sectional view of the rotor and nozzle ring utilized therein.

Figs. 13 and 14 are general views showing the connection of my compound meter to a pipe line.

Figs. 15 to 20 are views showing various details of my compound meter.

Fig. 21 is a vertical sectional view showing an extension of the compound meter shown in Fig. 11.

A section of the pipe carrying the steam or other fluid to be measured is designated by reference character 1. An orifice plate 2 is installed between flanges 3 and 4 in this pipe-line. The opening 5 in the orifice plate is shown in Fig. 1. Fluid flow through the pipe line is as indicated by the arrows in Fig. 2. A pipe connection 6 upstream from the orifice 2, and a similar connection 7 downstream from the orifice form the inlet and outlet of the meter body 8, which contains the rotating element. These pipes are connected to the meter body by inlet flange 9 and outlet flange 10.

A plate 11 of non-magnetizable material is used to seal the lower opening of the meter body, and also to act as a support for all moving parts of the meter. An interior annular integral projection 12 extending from this plate serves as a support for the interior mechanism, and for the cover plate or nozzle ring 13, through which are drilled or otherwise formed the turbine inlet nozzles 14a, 14b, 14c and 14d; also the dampening or retarding nozzles 15a, 15b, 15c and 15d, shown in Fig. 2. All of these nozzles are thus predesigned or fixed in area and length; that is, their characteristics are fixed.

A deflector or double reversing cone 16 is attached to the upper side of projection 12 by means of screws 17. A bottom cover plate 18 supports at its center a bottom bearing container 19 and a mounted jewel bottom-bearing 20, which supports the turbine shaft 21. A mounted ring jewel 22 serves as a guide bearing for the upper end of the shaft. On this shaft is mounted a hub 23 and a turbine rotor 24 having a plurality of blades 25. The upper end of deflector 16 is located just below the upper face of rotor 24. From Fig. 3 it will be noted that the flat top and the circular face of the rotor 24 may be formed of sheet steel, for example, the cylindrical working face being divided into a number of blades 25 initially formed by cutting or stamping out. Each blade is then twisted at substantially right angles and bent back on itself, as clearly shown in Fig. 3. In this way, a double blade surface is presented by each blade 25 to the impinging fluid, such blade surfaces being substantially equally spaced around the rotor and each one extending substantially radially.

In this way, a simplified, inexpensive and very efficient set of turbine blades 25 is provided.

It will be noted that in my rotor the driving fluid is directed radially inward toward or perpendicular to the rotor shaft, thus being so constructed as to conform with practices established by high authorities as being the most efficient. In this way axial thrusts, which tend to cause metering errors, are eliminated.

An assembly of reducing gears 26 is attached to the lower side of plate 18, from which assembly a lower shaft 27 extends to a permanent magnet 28. The bottom of shaft 27 rests upon, and is supported by a recessed portion 29 of the bottom plate 11. On the opposite side of this portion 29 another permanent magnet 30 is so mounted within an integrator as to revolve on an axis in line with shaft 27. This magnet 30 drives a conventional form of integrating register 31 as shown at the bottom of the meter.

The meter casing 8 comprises in its upper portion an annular space 32, which communicates with the inlet connecting pipe 6, and constitutes an inlet chamber to the various turbine nozzles 14a, 15a, etc. A similar annular space 33 connects with the outlet pipe 7 and forms an exhaust chamber for the turbine rotor. A series of exhaust ports 34 are drilled into the casing 12 to form a passageway into exhaust chamber 33 for fluid that has passed the turbine rotor.

Referring to Fig. 2, the operation of the meter involves the passage of fluid through the pipe line 1 in the direction of the arrows, and through the opening 5 in the orifice plate 2. On account of the restriction to fluid flow caused by this orifice plate, a differential pressure is established which causes fluid to flow through connecting pipe 6 in the direction of the arrows into the inlet chamber 32, through the various turbine nozzles 14 and 15, across the turbine blades 25, out through exhaust ports 34, into the exhaust chamber 33, and back through connecting pipe 7 to the downstream side of the main pipe line. In the passage of this fluid the turbine wheel 24 is revolved, thereby driving magnet 28 through the reducing gear 26. This magnet drives magnet 30 by magnetic attraction, which in turn drives the integrator.

It will be observed that all inlet nozzles 14a, 14b, 14c and 14d are so drilled as to form an acute angle with the radial turbine blades so that the impingement of fluid on these blades as directed from the nozzles will cause rotation of the turbine wheel in an anti-clockwise direction. It will also be observed that the nozzles designated by the suffix a and b are located diametrically opposite two similar nozzles designated c and d, so that any force applied to the rotor from the a and b nozzles is balanced so far as pressure on the rotor shaft is concerned, by the c and d nozzles.

In order to secure efficient operation of the turbine wheel it is necessary that the streams of fluid from the driving nozzles be directed against the blades at a relatively wide angle as illustrated, that is, at a relatively large angle with respect to the plane of the surface of the rotor blades, which extend radially about the rotor. Since the fluids ordinarily measured by this meter such as steam, air, gas, etc., have relatively small densities, the range of velocities developed by the passage of these light fluids through the turbine nozzles is such as to create excessive turbine speeds unless some means are employed to partially counteract these driving forces. In most former meters of this kind, a counteracting torque has been employed, as generally produced by a dampening vane constructed separate and apart from the turbine wheel. This vane was usually operated in some fluid having density characteristics not necessarily similar to that of the fluid which drives the turbine. Furthermore, in all such cases known to me, variations in the density and viscosity of the driving fluids did not necessarily coincide with such variations in the dampening fluid. This being the case, the dampening torque developed was not truly proportional to the driving torque; all of which causes such meters to register inaccurately.

In my meter the driving force from nozzles 14 would also produce excessive rotor speed, with consequent metering errors, if not opposed, and the method of applying this opposition constitutes an important feature of my invention. It will be observed that nozzles 15a, 15b, 15c, and 15d are similar to the driving nozzles 14, and set at angles relative to the turbine blades substantially equal to those of nozzles 14 except in the opposite direction. If all these nozzles 14 and 15 were of the same size, the forces resulting from the impingement of their jets on the turbine rotor would nullify each other, and there would be no rotation. Actually the retarding nozzles 15 (in this preferred design) are slightly smaller in diameter so that rotation of this turbine results in the direction of the driving jets.

Let us assume that the force from the driving jets necessary to produce a certain rotor speed is represented by an arbitrary number of 100 units, and that this force is opposed by a force of 90 units applied in the opposite direction from the retarding nozzles. Obviously, the fixed ten excess positive units are responsible for the actual or compromise speed of rotation of the turbine, but this does not mean that a torque involving ten force units is applied to the turbine shaft. Nine or more of these remaining force units may be expended in reversing the direction of the retarding jets, and only one unit impressed as a torque on the rotor shaft to overcome bearing friction.

It is therefore seen that opposing rotor torque is practically eliminated because the opposing forces acting on the rotor are substantially neutralized before they have an opportunity to produce a torque. The primary reason for the turning of the meter rotor is therefore because it is locked between two opposing forces, similar to the floating web of a geared differential. Metering errors resulting from opposing torques are, therefore, substantially eliminated.

In this meter the driving forces are produced by identically the same fluid as the retarding forces, and originate from the same source at the same time. The result of these opposing jets is to produce a dynamic differential perfect in every respect, and comparable with the static differential produced by the flow of fluid through the main pipe line orifice.

Practical operation demonstrates that the frictional resistance of the jeweled bearings of the rotating parts is overcome at a surprisingly low speed, and thereafter, as the dynamic differential increases, this meter approaches rotative perfection. This is true because the only other force that can affect the speed of the rotor is the small factor of turbine blade windage at excessive speeds, and this is produced in identically the same atmosphere as both the driving and retarding forces, and subject to the same second power laws.

In my preferred design, I have chosen to accomplish rotation by the use of unequal size (in cross-section) nozzles, similar but reversed angles, equal numbers of nozzles and single impingement on turbine blades. It is understood, however, that my invention involves the operation of the meter by means of a dynamic differential produced in any other way, such as for instance by the use of:

1. Similar nozzles (including cross-section), similar angles, unequal number of nozzles, and single impingement. (See Fig. 6.)

2. Multiple impingement of the jets on turbine blades by use of reversal of jet direction between blade impingement. (See Figs. 4 and 5.)

3. Any combination of these conditions.

Fig. 3 shows an enlarged view of the turbine rotor illustrating more clearly the double-back construction of the rotor blades 25.

Figs. 4, 5 and 6 show alternate methods for both driving and retarding the rotor in addition to the method shown in Fig. 2. Figs. 4 and 5 show a double impingement design wherein inlet nozzles 35 are provided. The fluid enters through inlet nozzles 35 and is directed against the rotor blades 25 from these nozzles. The fluid then passes between the reversing vanes 37 and 38 that are within the reversing chamber 39, thus reversing the direction of the fluid in this reversing chamber so as to direct the jets to again impinge against the turbine blades 25, thus counteracting the driving force produced by the jets from inlet nozzles 35. Outlet nozzles 36 conduct the fluid away from the rotor.

The third alternate method of driving and retarding is shown in Fig. 6 in which a plurality of inlet nozzles 40a, 40b and 40c are provided, and a plurality of retarding nozzles 41a and 41b, the driving nozzles being similar in size but greater in number than the retarding nozzles.

Other construction to accommodate these alternate methods of driving is similar to that described in Figs. 1 and 2.

The most practical and obvious result of the improvements embodied in this invention as herein set forth is to make possible much higher turbine speeds than have heretofore been used, since all limitations to speed have been removed except bearing friction. The steam turbine is essentially a high speed device, and the design of my meter follows approved turbine design much more closely than its predecessors. It is therefore significant to increase the speed of a turbine type meter without sacrificing metering accuracy. In so doing the metering range is extended upward in this elemental meter, and its simplicity makes possible the extension of the range downward by means of compounding.

Figs. 7 to 21 relate to my compound meter. It is inherently of the integrating type, and therefore, particularly adapted for use in totalizing service such as the sale of steam or gases.

It is a compound meter involving two (Figs. 7 and 11) or more (Figs. 8, 9, 21) metering elements on shunt fluid circuits around fixed or partially fixed orifices, and intended for wide range use.

The operation of such a compound meter will be considered in a preliminary way by means of the diagrammatic sketches—Figs. 7, 8 and 9—and the curve of metering accuracy in Fig. 10.

Assume a section of pipe line H in Fig. 9 constituting a meter body in which an orifice L is installed near its outlet end. This orifice is annular in form and constructed as a weighted valve which will begin to open when a predetermined differential pressure is impressed upon it. A turbine type metering element P is connected in a shunt circuit around this orifice by inlet and outlet pipes so that at all rates of flow part of the fluid passes the orifice L and the remainder traverses the metering circuit, the ratio of these flows at all rates remaining inversely proportional to the total frictional resistances of the respective circuits.

The orifice L is so sized that the rotor P begins to turn when one-half of one (arbitrary) unit of flow is established through the meter and begins to register with acceptable accuracy when a flow of one unit is reached. It will be observed from the diagram that in order for the fluid to reach orifice L, it must pass orifices I, J and K successively, and in so doing a portion of the fluid will be by-passed around and through metering elements M, N and O, each of which is identical in form, and method of connection, to the shunt meter P.

The frictional resistances of all these orifices I, J and K with their corresponding shunt circuits are so low that none of their respective shunt meters M, N and O begin to turn until a flow of three units is established. At this rate meter O begins to turn. At a flow of 6 units, four significant conditions are established.

1st—Rotor O begins to operate with acceptable accuracy as a meter.

2d—Rotor P reaches its full rated capacity.

3d—Orifice L begins to open, allowing an increase of fluid flow with no increase of differential pressure.

4th—Rotor P continues to turn, but at slower rates of speed than the corresponding fluid flow; therefore it ceases to function as a meter.

In the same way and in the same order, meter O reaches its full rated capacity at a flow of 36 units, and transfers the metering function to rotor N. Rotor N serving as a meter repeats the cycle and transfers the metering function to rotor M when the flow is again increased six fold to 216 units. This meter does not attain its full rated speed until the flow is again increased six fold to 1296 units. Throughout all rates of flow greater than 216 units, rotors N, O and P are either operating at speeds less than that at which they register as meters, or they may have ceased to rotate altogether, depending on details of construction to be considered later.

Orifice I is permanently fixed, therefore when the full rated flow of 1296 units is established, any further increase in flow increases the differential pressure drop across this orifice.

Meter M is so constructed that it can safely operate up to 100% overload or to 2592 units of flow without damage.

In this device the metering function passes successively from rotor P through O and N to M as the rate of flow increases. The speed of each rotor decreases as the metering function is transferred to the next higher rotor. In practice, therefore, these rotors are placed one above the other and connected together through suitable reducing gears and overriding clutches, so that the transfer of the metering function is automatic. Rotor P is on top, and rotor M at the bottom. Any rotor drives all rotors below it and correspondingly overrides all rotors above it. Rotor M has a register connected to it as shown in the preferred design, Fig. 11, so that the registration of all rotors is integrated through this bottom rotor.

When the rotors are placed one above another as shown in the preferred design, it is, of course, necessary to extend the inlet and outlet connections from a common rotor housing to each of the orifices. This is easily done without any sacrifice of metering accuracy, because such connections only increase the fixed resistance in the particular shunt circuit, this resistance being compensated for by suitable gear ratios.

The point on the meter body where each of these shunt circuit connections is made is important, for it is mainly by this means that the rotary speed of these secondary rotors is either slowed down or stopped altogether as the rate of flow increases and the metering functions are transferred successively to the next higher rate rotor. The reverse is, of course, also true for decreasing rates of flow. In Figures 7, 11 and 13, for instance, it will be noted that the upstream or inlet connection 62, to rotor 59 is taken from the body of the meter at a point near the venacontracta of the fixed orifice 54, that is, near the point where the static pressure under flow conditions is lowered due to the convergence of the fluid stream after passage through this orifice. The effect of this is to lower the differential pressure across openable orifice 55 as the rate of flow increases, and thereby slow down the speed of the low rate rotor 59, since the speed of this rotor is directly proportional to the square root of the differential across orifice 55.

The construction and weight-loading of openable orifice 55 also contributes to the speed reduction of this rotor, inasmuch as the horizontal lever-arm decreases in effective length as the orifice opens. This is indicated in Figure 17, by the movement of the bell-crank hinge pin from its "closed orifice" position 122, to its "open orifice" position 122a. The effect of this design is to progressively decrease the differential pressure required to open this orifice and, therefore, correspondingly decrease the speed of rotor 59.

Due to the importance of this principle in my meter I have illustrated still another means of slowing down the speed of these secondary rotors as illustrated in Figure 9. This construction is more particularly applicable to the larger size meters, but it is also theoretically applicable to all secondary rotors for all size meters. In this figure it will be noted that the inlet and outlet connections to the rotor P are taken from points located very close to the upstream and downstream sides of the openable orifice in its closed position "L." After this orifice is forced open only a small amount by the differential pressure caused by the flowing fluid, to the position LI it by-passes the outlet connection, and, therefore, eliminates the differential altogether. In this case the rotor stops.

These three described means limit the wear on these rotor bearings by causing them to operate only when they are driving the meter counter, which, in general, is only a small fraction of the total time the meter is in service. They, therefore, make possible a valuable operating feature of this compound meter, which applicant believes entirely new.

In this discussion it will be understood that I have used the term "secondary orifices" in a general way, to apply to all such orifices, whether secondary, tertiary, quaternary or still further on in the series.

The curve in Fig. 10 illustrates how each successive rotor ceases to function as a meter when the rate of fluid flow passes out of its range. The letters M, N, O and P representing metering accuracies in Fig. 10 correspond with the similarly lettered rotors in Fig. 9.

A meter having four rotors would be made only for very large pipe lines subjected to exceedingly wide ranges of flow, but this illustration is made to show that theoretically the compounding is unlimited, as further discussed in connection with Fig. 21.

The preferred form that will be described in detail operates on exactly the same principle except that it involves only two rotors instead of four, as diagrammatically indicated in Fig. 7.

Fig. 8 shows a form of compound meter in which three rotors E, F and G are utilized, E being in shunt to a fixed orifice B, and rotors F and G being respectively in shunt to variable orifices C and D. The operation of this form will be clear from the foregoing description of Fig. 9.

It will be noted that the second meter (in Figs. 7, 8 and 9) thus compounds with the first meter in each case to reduce the total error in metering or registration of total fluid flow on the integrator.

Likewise, in Figs. 8 and 9, the third meter compounds with the first and the second to still further reduce such total error.

Likewist, in Fig. 9, the fourth meter compounds with the first, second and third to still further reduce such total error.

This successive reduction in total error is graphically shown in Fig. 10, where the successive curves M, N, O and P indicate successively reduced total errors in metering over increasing percentages of full rated meter capacity.

Such reduction in total error may thus be carried on as far as desired, by the addition of a fifth, sixth, etc. meter.

The advantages of this invention are many fold.

1. It makes possible the integration on a single dial of rates and ranges of fluid flow so widely variable as to require, according to former practice, many separate meters.

2. It replaces and renders unnecessary a well established practice of connecting a flow meter to two different size orifices in a divided circuit line to be changed over manually from one orifice to another from season to season, or from time to time when conditions are known or thought to be such as to require such changes.

3. It completely eliminates all auxiliary power required to operate a flow meter, and in so doing, eliminates the interruptions to metering service occasioned by the inherent failures of such power.

4. By means of greatly improved primary metering elements this meter responds to changes in rates of flow, not only in fractions of a minute, as is done in meters which involve exterior sources of power to drive, but instantly in fractions of a second.

5. The invention specifically includes indefinite compounding. There is no limit. For instance, it is not only theoretically possible, but actually possible to measure accurately down to a fraction of one per cent of rated capacity. One revolutionary purpose is therefore to make available a meter having an exceptionally wide range of accuracy.

6. It completely eliminates the laborious planimetering of graphic charts to obtain integrated flow over wide ranges regardless of whether this be done by the hand method or machine method.

7. In selling gaseous commodities in large and varying quantities it provides a possibility never before provided for the vendors to measure accurately the entire product on a single meter which requires no attention between readings, and gives values instantly usable by engineers and accountants.

8. It provides a meter that requires no calibration. Responding in every case to fixed orifices, it is only necessary to adjust the speed of each element of the compound meter to register in the same units through suitable reducing gears.

9. It is a meter primarily adaptable for use on large size pipe lines—not in the sense that ordinary mercury operated flow meters are adaptable, but in the sense that the full capacity of the pipe line from very low to very high can be measured accurately.

Referring to Fig. 7 and to Figs. 11 to 15, inclusive, a section of pipe line 51 is equipped with an inlet flange 52 and an outlet flange 53, and a detachable orifice plate 54 is inserted near the inlet end as shown in Figs. 11, 13 and 15. A trunnion mounted butterfly type orifice 55 is located near the outlet end of the pipe section as shown in Figs. 13 and 14, and in more detail in Fig. 17. A rotor housing 56 shown in Figs. 11 and 14 contains the internal meter mechanism.

Turbine type rotors 58 and 59 are located one above the other in the rotor housing 56, separately. Pipe connection 60 serves as a fluid inlet to the high rate rotor 58, and a similar connection 61 as a discharge pipe therefrom. An inlet pipe 62 and a discharge connection 63 serve the low rate rotor 59. All of these inlet and discharge connections are attached to a common flange 64 as shown in Figs. 11 and 13, this flange being bolted to a companion flange 65 formed on one side of the main rotor housing 56, as shown in plan in Fig. 13. The main rotor housing 56 is provided with an upper flange connection 66, and a similar lower connection 67 as shown in Figs. 11 and 14. This housing 56 is also provided with inwardly projecting partition flanges 68 and 70, and a transverse diaphragm flange 69, which completely separates the upper from the lower portion of the rotor housing. This housing also contains openings 71, 72, 73 and 74 in the side flange 65, which register with the turbine inlet and outlet connections 61, 60, 63 and 62, respectively.

The various flanged partitions in the rotor housing 56 constitute four annular chambers located one above the other and designated 75, 76, 77 and 78. A bottom plate 79 of non-magnetizable material and a top plate 80 close the ends of the rotor housing 6. A cover plate and nozzle ring 81 as shown in vertical section in Fig. 11 and horizontal section in Fig. 12 serves as a turbine nozzle ring as well as a cover plate. It is attached to the interior flange 70 by screws 81a.

Into the lower portion of this ring are drilled or otherwise formed two turbine nozzles 82a and 82b, as shown in Fig. 12, diametrically opposite to which are drilled or otherwise formed two similar nozzles 82c and 82d, all of which are placed at identical angles with relation to the turbine blading. In the same way are drilled or otherwise formed retarding nozzles 83a and 83b, diametrically opposite of which are two similar nozzles 83c and 83d, all placed at identical angles with respect to the turbine blading.

A shaft 84 with a hub 84a carries the turbine rotor 59 having a plurality of blades 84b. The construction of blades 84b is similar to that of blades 25 (Fig. 3). The turbine shaft 84 is supported at its upper extremity by a ring jeweled bearing 85, and at its lower extremity by a pivot jewel bearing 86 contained in a screw mounting 87. The shaft 84 carries pinion 88 near its lower extremity which engages gear 89 mounted on shaft 89a, which extends through an adapter plug 90 to the upper portion 91 of a separable contacting device, of which the lower member is designated as 92. This lower contactor drives pinion 94 through shaft 92a, both of which are supported in the bracket 93. Pinion 94 drives pinion 95, which carries at its center a ratchet hub 96 and a pawl 96a, which over-rides a ratchet tooth 96b, thus forming an over-riding clutch, as shown in more detail in Fig. 20. The gear 95 is permanently attached to the ratchet hub 96, and the assembly supported by screw 97, which carries at its lower extremity a ring jewel which serves as an upper support for the lower turbine shaft 98. This shaft is supported at the bottom by the pivot jewel 99 supported in a jeweled container 100.

The rotor shaft supports the rotor hub 101 near its upper extremity, to which in turn is attached the rotor web 101a having blades 101b, constructed like blades 25 in Fig. 3. The rotor shaft 98 carries at its lower extremity a pinion 102, which engages the various gears in a reducing gear assembly 103a, which is mounted on cover plate 103, and drives shaft 104, which rests at its lower extremity on the recessed section 105 of the bottom plate 79. This shaft 104 drives a permanent magnet 106, which by magnetic attraction drives a corresponding permanent magnet 107 mounted in the integrator assembly 108.

Members 92, 92a, 93, 94, 95, 96, 96a, and 96b, for purposes of convenience, particularly in describing Fig. 21, will be designated as the first or lower driving means, while members 88, 89, 89a, and 91 will be designated as the second or upper driving means.

The bottom plate 79 carries an upper annular extension 109 which continues up to, and supports a cover plate 110, which is attached to it by screws 110a. The integral extension 109 has drilled into it a plurality of openings 111, which serve as discharge ports for fluid that has been reversed in direction by the double reversing cone 112. This reversing cone is also attached to the integral projection 109 by means of screws 112a. A similar reversing cone 113 serves the upper rotor 59, and is attached to the body diaphragm plate 69 by means of screws 113a. The integral member 109 is provided with nozzles about the rotor blades 101b of the rotor 58 similar to those shown in Fig. 12 about the rotor blades 84b of the rotor 59.

As previously stated, my invention is not limited to a two-element meter, such as shown in Fig. 11. The graph of metering accuracy in Fig. 10 indicates that as additional elements are added, the metering accuracy is carried progressively farther back toward zero of rated capacity.

The manner in which these additional rotors are installed is illustrated in Fig. 21. In this figure a bottom rotor housing 150 having an upper connecting flange 151, and at the top of the figure, another or top rotor housing 152 having a lower connecting flange 153, are disposed at the bottom and top respectively of an intermediate section or rotor housing 157. Top housing portion 152 and the parts contained therein are similar to the corresponding top portion and parts of rotor housing 56 in Fig. 11, except that the openings 154 and 155, bottom plate 156, and the inwardly projecting flange 156a have slightly different contours but accommodate the interior working parts, as shown, interchangeably with the top portion of the above-mentioned housing 56 of Fig. 11. The interior of bottom housing portion 150 is identical with the corresponding section of housing 56 of Fig. 11, and accommodates the corresponding interior working parts, as shown, interchangeably with the lower portion of the above-mentioned housing 56 of Fig. 11.

The three housing portions may be suitably secured together to form a functionally integral housing, as by bolts (not shown), passing through the illustrated flanges. The intermediate section or housing portion 157 comprises top and bottom flanges 158 and 159, a contoured bottom plate 160, and an inwardly projecting flange 161. Enclosed between these parts 160 and 161 is an annular chamber 162. Reversing cone 113 is attached to the bottom flange by screws 113a as in Fig. 11. The casing also includes outlet port 164 and the inlet port 165.

Turbine shaft 98 is provided, as in Fig. 11, and the following parts or members located near the bottom of this shaft are identical with similarly numbered parts near the bottom of shaft 84 in Fig. 11: 86, 87, 88, 89, 89a, 90 and 91. The turbine shaft carries at its upper extremity a rotor hub 101 and a turbine rotor 59 having a plurality of blades 101b, also identical with similar parts in Fig. 11. A nozzle ring 109a has drilled into it a plurality of driving and retarding nozzles—not shown in detail but identical in every respect with similar nozzles shown in Fig. 12. A cover plate 110 and parts or members 92, 92a, 93, 94, 95, 96, 96a, 96b and 97 are identical in every respect with similarly numbered parts already described in Fig. 11.

As previously mentioned, members 92, 92a, 93, 94, 95, 96, 96a, and 96b will be designated as the first or lower driving means, while members 88, 89, 89a and 91 will be designated as the second or upper driving means.

A new side flange 187 is supplied having six ports as follows: A primary rotor-outlet and inlet port 188 and 189 respectively; a secondary rotor-outlet and inlet port 190 and 191 respectively; a tertiary rotor-outlet and inlet port 192 and 193 respectively. These connections are extended to the downstream and upstream sides respectively of the primary, secondary and tertiary orifices as designated by letters B, C and D in Fig. 8.

All parts of the compound meter as shown in Fig. 11 attached to the lower flange 79, both above and below, will fit into and be properly operated in connection with rotor housing 150, as shown in the lower portion of Fig. 21. In the same way, all working parts attached to or located above the diaphragm 69 in Fig. 11 will fit into and be operated within the rotor housing 152, shown in Fig. 21, and be closed at the top by a plate similar to plate 80 of Fig. 11. Such an arrangement of parts completes the three-element meter, the operation of which is identical with that of the two-element meter except that three rotors are involved instead of two.

In the same way, two or as many more meter elements as desired may be inserted in a corresponding number of intermediate housing portions 157 between the lower housing 150 and the upper housing 152, together with appropriate vertical side flanges, connecting pipes, openable orifices and other parts, as previously described in detail, to form a multi-rotor compound meter, the rotor assemblies inserted being identical with that enclosed in the rotor housing 157 in Fig. 21, while the top and bottom meter elements are, in all cases, identical with those in Fig. 11 and Fig. 21.

Fig. 21 thus illustrates a very important novel characteristic of my meter, namely, its ready adaptability to the use of three, four, or any higher number of meter rotors.

In this way, I provide a meter having as great a degree of accuracy as desired, in line with the discussion of Figs. 7 to 10, inclusive. It is particularly noted that Fig. 21 corresponds to the diagrammatic Fig. 8, showing three meters.

Referring to Fig. 15, the orifice plate 54 is attached by means of screws 114a to the ring 114, which is welded to the pipe line body 51.

The butterfly type orifice 55 is shown in detail in Figs. 16, 17, 18 and 19. The circular orifice plate 55 (Fig. 17) carries a slot 55c (Fig. 16) made for the purpose of clearing the connecting link 123 as it is rotated on trunnions 115 and 116. These trunnions and their corresponding bosses 117 and 118 are shown in Fig. 16.

A counter weight shaft 119 extends through and is attached to the butterfly orifice plate 55 at a point slightly above its trunnion axis, and carries an adjustable counter weight 120 on one end and a hub 121 on the opposite end, to which the link 123 is connected by a cotter pin 122. The counter weight 120 is adjusted to a position where it just balances hub 121 and connecting link 123, so that normally the butterfly type orifice 55 tends to hang in a substantially vertical position. This connecting link 123 has at its lower extremity a slot 123a, which permits the link to assume a position in which its extremities are designated as 122b and 124b when rotated in a clockwise direction to the limit of its travel, caused by a back pressure. When the butterfly orifice is rotated in a counter clockwise or normal direction to the limit of its travel indicated by dotted lines 55a, the extremities of the connecting link are designated by points 122a and 124a.

A retarding device, such as a dash-pot device, is constructed with welding flanges 125 and 126 with a closed bottom portion 132, and is equipped with an inner lining 127. The weighted dashpot piston 128 has a projecting member 129 attached to its top, as shown in detail in Fig. 18. This extension in turn carries a roller guide 130, as shown in Fig. 19, carrying rollers 131 and attachment screws 133. The roller guide 130 is split, as indicated at 130a, and the member 129 is slotted to permit proper clearance for connecting link 123. The extension piece 129 is attached to the dash-pot by means of screw 134.

The operation of the preferred structure shown in Figs. 11 to 20 will be clear from the foregoing discussion, taken in conjunction with the description of Figs. 7 to 10.

While I have shown various novel structures for obtaining the desired results, I do not wish to be restricted to the details shown, inasmuch as various other means may be provided without departing from the spirit and scope of my invention. I desire, therefore, that only such limitations shall be imposed thereon as are indicated in the appended claims.

I claim as my invention:

1. In a fluid meter for measuring the flow of a fluid through a conduit, the combination comprising, means providing a restricted cross sectional area in the conduit forming a fixed orifice therein, valve means disposed in the conduit downstream from the fixed orifice, the valve means cooperating with the conduit to provide a variable orifice having a minimum open position and being operable to a predetermined wider open position, the variable orifice being normally retained in its minimum open position, a rotor housing having a plurality of fluid circuits therethrough, one disposed in parallel relation with each orifice, a meter rotor operably inserted in each of the fluid circuits, an integrator, means operably connecting the meter rotors for driving the integrator, the variable orifice being at its minimum open position at or below a predetermined rate of flow of fluid therethrough and being operable towards the predetermined wider open position at a rate of flow therethrough greater than said predetermined rate, and an over-riding clutch disposed in the connection between the meter rotors for effectively disengaging the variable orifice meter rotor from the connecting drive of the integrator when the variable orifice is in said predetermined wider open position whereby the integrator is driven by only the fixed orifice meter rotor while the variable orifice meter rotor is so disengaged from the drive.

2. In a fluid meter for measuring the flow of a fluid through a conduit, the combination comprising, means providing a restricted cross sectional area in the conduit forming a fixed orifice therein, a plurality of valve means disposed in the conduit downstream from the fixed orifice and cooperating with the conduit to provide a plurality of variable orifices, each of the variable orifices having a minimum open position and being operable to a predetermined wider open position, each of the variable orifices being normally retained in its minimum open position, the minimum open positions of said plurality of variable orifices progressively decreasing in size from the fixed orifice downstream in the conduit, a rotor housing having a plurality of fluid circuits therethrough, one disposed in parallel relation with each orifice, a meter rotor operably inserted in each of the fluid circuits, an integrator, means operably connecting the meter rotors for driving the integrator, each of the variable orifices being at its minimum open position at or below a predetermined rate of flow of fluid therethrough and being operable towards the wider open position at a rate of flow therethrough greater than said predetermined rate, the rates of flow for effecting operation of the different variable orifices to their wider open positions being different for the several orifices and being a lower rate of flow for each successive orifice downstream from the fixed orifice, and an over-riding clutch disposed between each adjacent pair of meter rotors for effectively disengaging one of the pair of meter rotors from the connecting drive of the integrator as the rate of fluid flow increases and the orifice associated with said one of the pair is operated to its wider open position.

3. In a fluid meter for measuring the flow of a fluid through a conduit, the combination comprising, means providing a restricted cross sectional area in the conduit forming a fixed orifice therein, a valve means disposed in the conduit downstream from the fixed orifice, the valve means cooperating with the conduit to provide a variable orifice having a minimum open position and being operable to a predetermined wider open position, the variable orifice having a smaller capacity than the fixed orifice when the variable orifice is in its minimum open position, a housing having a separate fluid passageway in shunt about each of the orifices, a meter rotor operably inserted in each of the passageways, an integrator, means connecting the upstream meter rotor in the passageway about the fixed orifice to the integrator, means including an over-riding clutch connecting the downstream meter rotor in the passageway about the variable orifice through the upstream meter rotor to effectively operate the integrator so long as the downstream meter rotor operates in response to a rate of flow of fluid through its associated passageway greater than the rate of flow of fluid through the passageway associated with the upstream meter rotor.

4. In a fluid meter for measuring the flow of a fluid through a conduit, the combination comprising, means providing a restricted cross sectional area in the conduit forming a fixed orifice therein, a plurality of valve means disposed in the conduit downstream from the fixed orifice, each of the valve means cooperating with the conduit to provide a variable orifice having a minimum open position and being operable to a predetermined wider open position, means cooperating with each of the valve means in response to the rate of flow of the fluid in the conduit for maintaining the associated variable orifice in its minimum open position when the flow of fluid is at or below a predetermined rate and to control the movement of the variable orifice towards its wider open position when the flow is greater than said predetermined rate, the minimum open positions of the variable orifices progressively decreasing in size downstream from the fixed orifice and overlapping the wider open position of the successive downstream variable orifices, a rotor housing having a plurality of fluid circuits therethrough, one disposed in parallel relation with each orifice, an integrator, a plurality of fluid meter rotors, one meter rotor installed in each of the fluid circuits, the meter rotors being operably connected through an over-riding drive to one another and to the integrator to effect a positive drive of the integrator for a predetermined range of the rate of flow depending upon the movement of the associated variable orifice from the minimum to the wider open position to control the flow of fluid through the associated fluid circuit in which the meter rotor is installed, the overlap of the minimum open position with the wider open position of the successive downstream variable orifices effecting successive operation of the meter rotors towards the fixed orifice as the rate of flow progressively increases to effect compounding in the successive operation of the meter rotors driving the integrator to reduce the total error in registration of the total fluid flow on the integrator.

5. In a fluid meter for measuring the flow of a fluid through a conduit, the combination comprising, means providing a restricted cross sectional area in the conduit forming a fixed orifice therein, a plurality of valve means disposed in the conduit downstream from the fixed orifice, each of the valve means cooperating with the conduit to provide a variable orifice having a minimum open position and being operable to a predetermined wider open position, means cooperating with each of the valve means in response to the rate of flow of the fluid in the conduit for maintaining the associated variable orifice in its minimum open position when the flow of fluid is at or below a predetermined rate and to control the movement of the variable orifice towards its wider open position when the flow is greater than said predetermined rate, the minimum open positions of the variable orifices progressively decreasing in size downstream from the fixed orifice and overlapping the wider open position of the successive downstream variable orifices, a rotor housing having a plurality of fluid circuits therethrough, one disposed in parallel relation with each orifice, an integrator, a fluid meter rotor installed in each of the fluid circuits, means connecting the meter rotors to one another and to the integrator to effect a positive drive of the integrator for a predetermined range of the rate of flow depending upon the movement of the associated variable orifice from the minimum to the wider open position to control the flow of fluid through the associated fluid circuit in which the meter rotor is installed, the overlap of the minimum open position with the wider open position of the successive downstream variable orifices effecting successive operation of the meter rotors towards the fixed orifice as the rate of flow progressively increases, and an over-riding clutch disposed in the connection between the meter rotors for effectively disengaging the successive upstream meter rotors from the connecting drive of the integrator when the variable orifice associated with a meter rotor is in the wider open position overlapped by the minimum open position of a successive variable orifice towards the fixed orifice, the meter rotors thereby cooperating to successively effect the positive operation of the integrator as the rate of flow increases.

6. In a fluid meter for measuring the flow of a fluid through a conduit, the combination comprising, means providing a restricted cross-sectional area in the conduit forming a fixed orifice therein, a butterfly orifice plate disposed in the conduit downstream from the fixed orifice and cooperating with the conduit to provide a variable orifice, the butterfly orifice plate being disposed transversely of the conduit, a counter-weight connected to the plate so as to maintain the plate and variable orifice formed thereby in a minimum open position when the flow of fluid therethrough is below a predetermined rate, the counterweight cooperating with the plate to control the movement of the variable orifice towards a wider open position as the flow of fluid in the conduit increases above said predetermined rate, a rotor housing having a pair of fluid circuits therethrough, one disposed in parallel relation with each orifice, a meter rotor operably inserted in each of the fluid circuits, an integrator, means operably connecting the meter rotors for driving the integrator, and an over-riding clutch disposed in the connection between the meter rotors whereby the meter rotor in the fluid circuit controlled by the variable orifice is effective to operate the integrator so long as the variable orifice meter rotor is driven in response to a flow in its associated fluid circuit greater than the flow in the fluid circuit controlled by the fixed orifice, and means connecting the meter rotor associated with the fixed orifice to the integrator for registering thereon the total fluid flow through the meter.

7. In a fluid meter for measuring the flow of a fluid through a conduit, the combination comprising, means providing a restricted cross-sectional area in the conduit forming a fixed orifice therein, a plurality of butterfly orifice plates disposed in the conduit downstream from the fixed orifice and cooperating with the conduit to provide a plurality of variable orifices, each of the butterfly plates being normally disposed transversely of the conduit, a counterweight connected to each plate so as to maintain the plate and variable orifice formed thereby in a minimum open position when the flow of fluid therethrough is below a predetermined rate, the counterweight cooperating with the plate to control the movement thereof to vary the size of the variable orifice to a wider open position as the flow of fluid in the conduit increases above said predetermined rate, the minimum open positions of the variable orifices progressively decreasing in size downstream from the fixed orifice and overlapping the wider open position of the successive downstream variable orifices, a rotor housing having a plurality of fluid circuits therethrough, one disposed in parallel relation with each orifice whereby the flow of fluid in each fluid circuit is controlled by an associated orifice, an integrator, a fluid meter rotor installed in each of the fluid circuits and disposed to be driven in accordance with the flow of fluid therethrough, means connecting each of the meter rotors to the successive upstream meter rotors and to the integrator to effect a positive drive of the integrator so long as a meter rotor operates in response to a flow in its associated fluid circuit greater than the flow in the fluid circuits of the successive upstream meter rotors.

8. In a fluid meter for measuring the flow of a fluid through a conduit, the combination comprising, means providing a restricted cross-sectional area in the conduit forming a fixed orifice therein, a plurality of butterfly orifice plates disposed in the conduit downstream from the fixed orifice and cooperating with the conduit to provide a plurality of variable orifices, each of the butterfly plates being normally disposed transversely of the conduit, a counterweight connected to each plate so as to maintain the plate and variable orifice formed thereby in a minimum open position when the flow of fluid therethrough is below a predetermined rate, the counterweight cooperating with the plate to control the movement thereof to vary the size of the variable orifice to a wider open position as the flow of fluid in the conduit increases above said predetermined rate, the minimum open positions of the variable orifices progressively decreasing in size downstream from the fixed orifice and overlapping the wider open position of the successive downstream variable orifices, a rotor housing having a plurality of fluid circuits therethrough, one disposed in parallel relation with each orifice whereby the flow of fluid in each fluid circuit is controlled by an associated orifice, an integrator, a fluid meter rotor installed in each of the fluid circuits and disposed to be driven in accordance with the flow of fluid therethrough, means connecting the meter rotors to drive the integrator, and an over-riding clutch disposed in the connecting means between each of the meter rotors for effectively disengaging the successive upstream meter rotors from the connecting drive of the integrator when the variable orifice associated with a meter rotor is in the wider open position overlapped by the minimum open position of a successive variable orifice towards the fixed orifice, the meter rotors thereby cooperating to successively effect the positive operation of the integrator as the rate of flow increases.

9. In a fluid meter for measuring the flow of a fluid through a conduit, the combination comprising, means providing a restricted cross-sectional area in the conduit forming a fixed orifice therein, a plurality of butterfly orifice plates disposed in the conduit downstream from the fixed orifice and cooperating with the conduit to provide a plurality of variable orifices, each of the butterfly plates being normally disposed transversely of the conduit, a counterweight connected to each plate so as to maintain the plate and variable orifice formed thereby in a minimum open position when the flow of fluid therethrough is below a predetermined rate, the counterweight cooperating with the plate to control the movement thereof to vary the size of the variable orifice to a wider open position as the flow of fluid in the conduit increases above said predetermined rate, the minimum open positions of the variable orifices progressively decreasing in size downstream from the fixed orifice and overlapping the wider open position of the successive downstream variable orifices, a rotor housing having a plurality of compartments disposed one above the other, a compartment corresponding to each of the orifices, each of the compartments forming a part of a fluid circuit for conveying fluid around an associated orifice, the fluid circuits of the progressive compartments from one end of the housing to the other being associated with successive orifices in the conduit, an integrator, and a meter rotor in each of the compartments inserted in the fluid circuit thereof to be driven in response to the flow of the fluid therethrough, means including an over-riding clutch connecting each of the meter rotors to the successive upstream meter rotors and to the integrator to effect a positive drive of the integrator so long as a meter rotor operates in response to a flow in its associated fluid circuit greater than the flow in the fluid circuits of the successive upstream meter rotors.

10. In a fluid meter for measuring the flow of a fluid through a conduit, the combination comprising, means providing a restricted cross-sectional area in the conduit forming a fixed orifice therein, a plurality of butterfly orifice plates disposed in the conduit downstream from the fixed orifice and cooperating with the conduit to provide a plurality of variable orifices, each of the butterfly plates being off-center pivotally mounted transversely of the conduit, a counterweight connected to each plate so as to maintain the plate and variable orifice formed thereby in a minimum open position when the flow of fluid therethrough is below a predetermined rate, the counterweight cooperating with the plate to control the movement thereof to vary the size of the variable orifice to a wider open position as the flow of fluid in the conduit increases above said predetermined rate, the minimum open positions of the variable orifices progressively decreasing in size downstream from the fixed orifice and overlapping the wider open position of the successive downstream variable orifices, a rotor housing having a plurality of compartments disposed one above the other, a compartment corresponding to each of the orifices, each of the compartments forming a part of a fluid circuit for conveying fluid around an associated orifice, the fluid circuits of the progressive compartments from one end of the housing to the other being associated with successive orifices in the conduit, an integrator, and a meter rotor in each of the compartments inserted in the fluid circuit thereof to be driven in response to the flow of the fluid therethrough, means including an overriding clutch connecting each of the meter rotors to the successive upstream meter rotors and to the integrator to effect a positive drive of the integrator so long as a meter rotor operates in response to a flow in its associated fluid circuit greater than the flow in the fluid circuits of the successive upstream meter rotors.

WILBUR W. STEVENSON.

REFERENCES CITED

The following references are of record in the file of this patent:

UNITED STATES PATENTS

| Number | Name | Date |
|---|---|---|
| 173,693 | Tylor | Feb. 15, 1876 |
| 864,579 | Volz | Aug. 27, 1907 |
| 897,567 | Wood | Sept. 1, 1908 |
| 934,504 | Connet | Sept. 21, 1909 |
| 945,742 | Boeckel et al. | Jan. 11, 1910 |
| 986,423 | Coleman | Mar. 7, 1911 |
| 1,031,689 | Chrisman | July 9, 1912 |
| 1,172,452 | Hanks | Feb. 22, 1916 |
| 1,209,700 | Hanks | Dec. 26, 1916 |
| 1,307,337 | Bassett | June 24, 1919 |
| 1,823,308 | Winton | Sept. 15, 1931 |
| 1,954,453 | Markle et al. | Apr. 10, 1934 |
| 2,100,495 | Stevenson | Nov. 30, 1937 |
| 2,165,153 | Purdie | July 4, 1939 |

FOREIGN PATENTS

| Number | Country | Date |
|---|---|---|
| 48,970 | Austria | July 10, 1911 |